(12) United States Patent
Castellanos et al.

(10) Patent No.: US 8,176,080 B2
(45) Date of Patent: May 8, 2012

(54) DESENSITIZING CHARACTER STRINGS (75) Inventors: Maria G. Castellanos, Sunnyvale, CA (US); Umeshwar Dayal, Saratoga, CA (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 545 days.

(21) Appl. No.: 12/399,675

(22) Filed: Mar. 6, 2009

(65) Prior Publication Data
US 2010/0228783 A1 Sep. 9, 2010

(51) Int. Cl.
*G06F 17/30* (2006.01)
(52) U.S. Cl. .......... 707/786; 707/783; 707/796
(58) Field of Classification Search .......... 704/1–2, 704/7, 9–10, 250–251, 257; 382/177–178, 382/161, 193, 200; 715/259–265; 717/136, 717/141–143; 707/711, 748, 752–753, 755–756, 707/777–778, 791, 795, 796–797, 825, 829–830, 707/781, 783, 785–786, 790, 807
See application file for complete search history.

(56) References Cited

U.S. PATENT DOCUMENTS

| | | | | |
|---|---|---|---|---|
| 4,471,459 A | * | 9/1984 | Dickinson et al. | 715/202 |
| 5,303,367 A | * | 4/1994 | Leenstra et al. | 1/1 |
| 5,673,042 A | * | 9/1997 | Yoshida et al. | 341/51 |
| 5,787,426 A | * | 7/1998 | Koshiba et al. | 1/1 |
| 5,799,303 A | * | 8/1998 | Tsuchimura | 1/1 |
| 5,841,376 A | * | 11/1998 | Hayashi | 341/51 |
| 6,047,283 A | * | 4/2000 | Braun | 1/1 |
| 6,169,972 B1 | * | 1/2001 | Kono et al. | 704/257 |
| 6,359,548 B1 | * | 3/2002 | Cooper | 341/50 |
| 6,681,370 B2 | * | 1/2004 | Gounares et al. | 715/238 |
| 6,741,999 B2 | * | 5/2004 | Wagner | 1/1 |
| 7,747,633 B2 | * | 6/2010 | Kadiyska et al. | 707/755 |
| 7,797,341 B2 | * | 9/2010 | Castellanos et al. | 707/783 |
| 2001/0021261 A1 | * | 9/2001 | Koga et al. | 382/101 |
| 2003/0084031 A1 | * | 5/2003 | Tarquini | 707/3 |
| 2003/0097252 A1 | * | 5/2003 | Mackie | 704/9 |
| 2003/0187877 A1 | * | 10/2003 | Kuboyama et al. | 707/104.1 |
| 2003/0233346 A1 | * | 12/2003 | Mathur et al. | 707/3 |
| 2004/0021691 A1 | * | 2/2004 | Dostie et al. | 345/773 |
| 2004/0249805 A1 | * | 12/2004 | Chuvilskiy | 707/3 |
| 2006/0206304 A1 | * | 9/2006 | Liu | 704/2 |
| 2008/0071733 A1 | * | 3/2008 | Shadmon et al. | 707/2 |

FOREIGN PATENT DOCUMENTS
EP 0419889 * 4/1991
(Continued)

OTHER PUBLICATIONS

Bob Carpenter,"Scaling high-order character language models to gigabytes", Published in:o Proceeding Software '05 Proceedings of the Workshop on Software Association for Computational Linguistics Stroudsburg, PA, USA ©2005.*

(Continued)

*Primary Examiner* — Srirama Channavajjala (57) ABSTRACT

A method for desensitizing character strings comprises ordering an original set of character strings and generating a tree structure that has nodes corresponding to the ordered set of sensitive strings. The sensitive characters on the nodes of the tree are then desensitized in depth-first order such that a set of desensitized strings is generated that preserves the ordering of the original sensitive set.

18 Claims, 9 Drawing Sheets

FOREIGN PATENT DOCUMENTS

| WO | WO 99/44151 | * | 9/1999 |
| WO | WO 03/005166 | * | 1/2003 |
| WO | WO 2005001611 | * | 1/2005 |
| WO | WO 2008/121886 | * | 10/2008 |

OTHER PUBLICATIONS

Xiangyun Ye, et al. "StrCombo: combination of string recognizers", Pattern Recognition Letters 23 (2002) 381-394.*

Tatsuya Akutsu Approximate string matching with don't care characters, Information processing letters 55 (1995) 235-239.*
Raphael Clisford, "Distributed suffix trees", Journal of discrete algorithms, 3(2005) 176-197.*
Nabil R. Adam et al., Security-Control Methods for Statistical Databases: A Comparative Study, ACM Computing Surveys, vol. 21, No. 4, Dec. 1989 (42 pages).
Rakesh Agrawal et al., Privacy-Preserving Data Mining, SIGMOD Rec. 29, No. 2 (2000) (12 pages).

* cited by examiner

| ENTRY | COUNTER |
|---|---|
| 0 | 2 |
| 1 | 1 |
| 2 | 2 |
| 3 | 1 |
| 4 | 1 |
| 5 | 0 |
| 6 | 1 |
| 7 | 1 |
| 8 | 0 |
| 9 | 2 |
| 10 | 1 |
| 11 | 1 |
| 12 | 1 |
| 13 | 0 |
| 14 | 1 |
| 15 | 1 |
| 16 | 2 |
| 17 | 0 |
| 18 | 1 |
| 19 | 0 |

FIG. 9

POINTER LIST
0,9,10,11,12

| ENTRY | COUNTER |
|---|---|
| 0 | AB |
| 1 | S |
| 2 | CN |
| 3 | 0 |
| 4 | 10 |
| 5 | |
| 6 | 0 |
| 7 | 10 |
| 8 | |
| 9 | EO |
| 10 | T |
| 11 | 0 |
| 12 | 10 |
| 13 | |
| 14 | B |
| 15 | A |
| 16 | 10C |
| 17 | |
| 18 | 1 |

FIG. 14

DESENSITIZING CHARACTER STRINGS

BACKGROUND

Information Management Systems (IMS), such as Database Management Systems (DBMSs), as with any other software applications, are not perfect and issues with the software (e.g., bugs, poor performance, etc.) often may appear. To address these issues, it is useful to have some tool that allows a software developer or IMS manager to troubleshoot the application. However, unlike other types of software applications, the behavior of an IMS depends heavily on the information itself. Thus, to troubleshoot issues, it is necessary to reproduce the conditions in which the issues have appeared. Such reproduction requires not only replication of the contents of the IMS itself, but also the attributes of those contents.

In a production environment, an IMS contains data that come from real entities, such as people, businesses, and governmental organizations. This data often is sensitive (e.g., social security numbers, salaries, birthdates, telephone numbers, etc.) and should be treated with extreme care, since even a small leak or loss of the data could seriously affect the entities associated with the data, as well as a business or an IMS provider's reputation. In addition, government regulations often require software companies to comply with regulations that have been issued with the specific purpose of protecting a user's privacy. Accordingly, to avoid the possibility of compromising sensitive data, the data associated with an IMS should be desensitized when testing or developing the IMS.

BRIEF DESCRIPTION OF THE DRAWINGS

Some embodiments of the invention are described with respect to the following figures.

DETAILED DESCRIPTION

Modern Database Management Systems (DBMSs) generally base their data logic modeling on a relational model, using Structured Query Language (SQL) as the dialect between the system and the user. Given the declarative nature of the language, the task of determining how to execute a given query is left to the DBMS, while the user (or machine) specifies which information is requested. As a result, queries may be answered in many different ways, with the DBMS internally determining the best way of executing a given SQL statement.

To do this, DBMSs generally base their behavior on an internal optimization model that assigns estimated costs to different execution plans. The assignation of costs depends heavily on the statistical attributes of the data contained in the DBMS. Thus, if a desensitization technique has the goal of replicating system performance, the transformations of the data that result from desensitization should maintain certain attributes of the original data. In general, the transformation should preserve the copula of the distribution of the original data set. The copula of a distribution is the distribution with all unevenness in the marginal variables of the original distribution removed. Preserving the copula of the distribution will maintain the alphanumeric order of entries in each column of a table and the alphanumeric order of characters within table entries. In addition, the sizes of the tables contained in the DBMS should not be changed, the number of unique entries in each column of a table should remain the same, and the length of each string should remain the same. As a result, query cardinality will be preserved (and consequently, the any execution plans for queries should be the same, allowing the re-creation of scenarios on desensitized data for performance testing). Queries that contain predicates referencing sensitive columns should be transformed accordingly, and dependent columns should be transformed using the same desensitized data set. Finally, the transformation should be irreversible in that once the desensitization is complete, the original data cannot be retrieved. In principle, the map generated for the transformation will be discarded; however, in practice, any such maps may be maintained so that the data could be reversed to their sensitive form.

Figure 1:
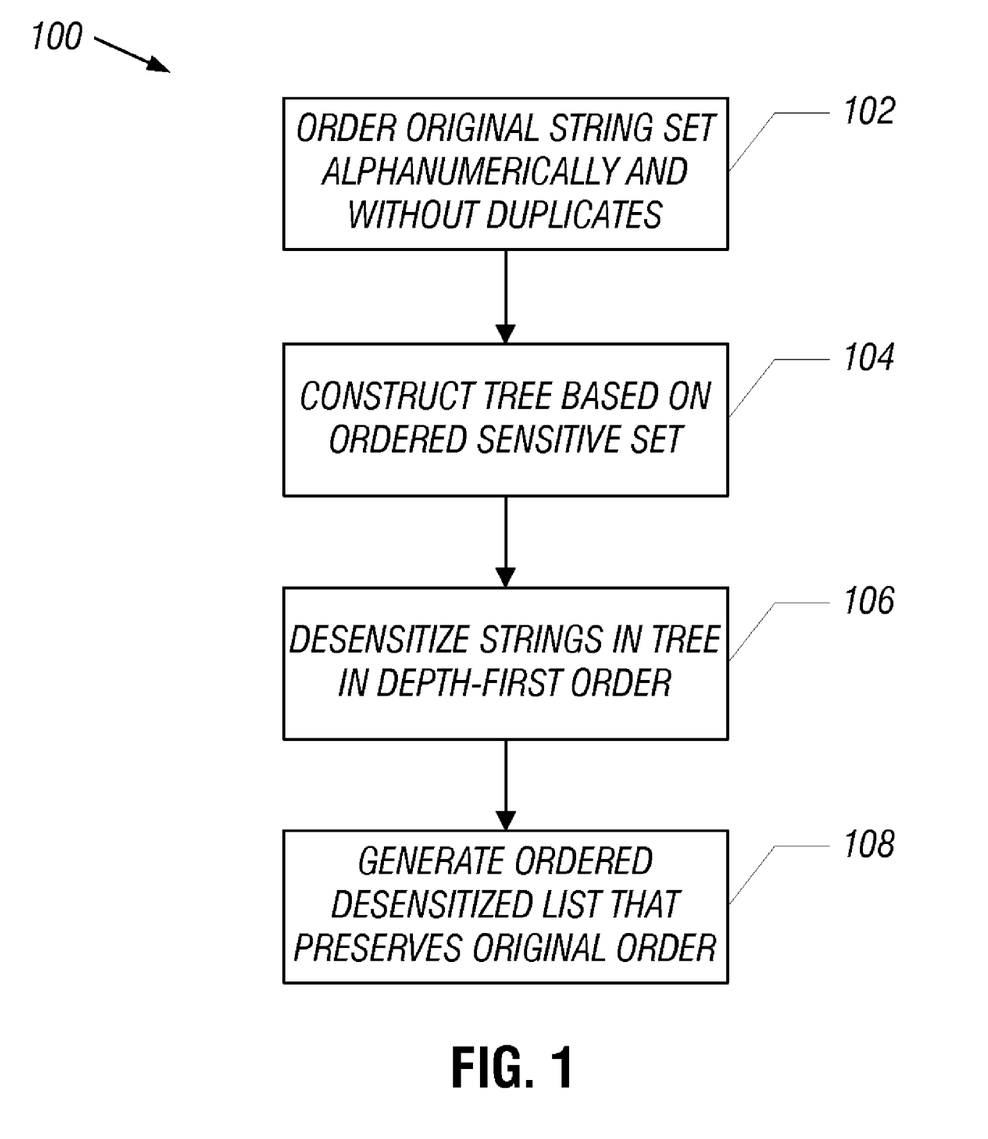
FIG. 1 is a flow diagram of an exemplary desensitization technique in accordance with an embodiment of the invention.

Desensitization techniques for desensitizing query predicates and data strings of a DBMS in accordance with these goals are described hereinafter. FIG. 1 illustrates a high-level flow diagram of a string desensitization technique 100 in accordance with an embodiment of the invention. As shown in FIG. 1, a sensitive data set is created by ordering the original set of strings in the data set without duplication (block 102). Based on the contents of the sensitive data set, a tree data structure (e.g., a tree) is constructed (block 104). The tree structure is traversed in depth-first order and strings contained in it are desensitized (block 106). An ordered desensitized set is generated that preserves the original ordering of the sensitive set (block 108). In some embodiments, as will be described in further detail below, tree construction and desensitization may be performed in an iterative manner.

The desensitization technique shown in FIG. 1 includes several components. These components include a sorted sensitive string set S, an original character set C, and a desensitization character set D, which are provided as inputs to the desensitization process. The components also include a desensitized string set T, which is the output of the desensitization process. For instance, the sorted sensitive string set may be expressed as:

$$S=\{s_1, s_2, \ldots, s_N\}$$

(e.g., {Ashton, Bridget, Bryan, . . . }), where S is the set of strings to be desensitized, including both strings in a data table and strings that are in query predicates, but not in the table; N is the total number of strings in S; and $s_i <= s_j$, for any pair $1 \leq i < j \leq N$, such that all the strings are sorted in alphanumerical order.

The original character set may be expressed as:

$$C=\{c_1, c_2, \ldots, c_K\}$$

(e.g., {A-Z, a-z, 0-9, _}), where C is the original character set of the strings in S; K is the total number of characters in C; and $c_i \leq c_j$, for any pair $1 \leq i < j \leq K$, such that the character set, C, is in sorted order.

The character set for the desensitized strings may be defined as D, where D is not the same character set as C and has at least one more element, such that even the last character of C may be replaced by a character that is strictly larger. In general, D may be any set of symbols, and may be a completely different set of symbols, such as a character set of a different language (e.g., Japanese conji). Thus, D may be expressed as:

$$D=\{d_1, d_2, \ldots, d_L\}$$

(e.g., {A-Z, a-z, 0-9, _, *, @, #, $, %, &, . . . }), where L is the total number of characters in D and $L \geq K+1$; and $d_i \leq d_j$, for an pair $1 \leq i < j \leq L$, such that the character set of D is in sorted order.

The output component of the desensitization process is the desensitized string set, which may be expressed as:

$$T=\{t_1=\text{desensitize}(s_1), t_2=\text{desensitize}(s_2), \ldots, t_N=\text{desensitize}(s_N)\}$$

(e.g., {Bol4@$, R9_sTwe, R92dR, . . . }), where $t_i \leq t_j$, for any pair $1 \leq i < j \leq N$, and if $s_i \neq s_j$, then $t_i \neq t_j$.

In the flow diagram of FIG. 1, the sensitive string set S is input to the desensitization process 100, all duplicates are removed, and the remaining elements are sorted alphanumerically (block 102). Next, a tree structure is constructed based on the string set S. A tree representing the entire string set S may be constructed before the transformation of the characters in set S begins. In other embodiments, because storage of an entire tree may be a costly task, the tree may be constructed dynamically, with portions of the tree being created as strings are read from memory, desensitized, and then unloaded from memory, as will be explained in more detail below.

Once the tree has been constructed (either entirely or dynamically) (block 104), the next step is to iterate through each of the elements of the tree to desensitize the characters. In one embodiment, the tree is traversed in depth-first order so that the resulting desensitized set preserves the alphanumeric order of the original string set. On each iteration through the tree, new characters are assigned to the original characters in a manner that preserves the copula of the distribution of the original sensitive set. For instance, the original sensitive characters may be transformed into new characters in accordance with a random montone transformation (i.e., for montone increasing, if original (a)>original (b), then transformed(a)> transformed (b)). In this manner, the transformation preserves the alphanumeric ordering of the original set (block 106). In other embodiments, tree traversal may be performed in other manners that also preserve the alphanumeric order of the original set.

After all iterations are complete, the tree is converted to a list of desensitized strings (block 108). Again, the list creation may be performed either dynamically as strings are transformed or may be performed after all elements in the tree structure have been transformed.

The implementation of the steps shown in FIG. 1 may be performed in various manners depending on the system in which the technique is implemented and the desires of the user. For instance, memory constraints may prevent an implementation in which a tree representing the complete string set is constructed prior to the transformation of the elements in the tree. In such embodiments, the user instead may elect to construct the tree dynamically as strings are read and desensitized strings are unloaded and placed in a list. In other embodiments, even when choosing to construct the tree dynamically, the user may choose between a method that more quickly generates the desensitized string set at the cost of limiting the randomness of the transformation process, or a method that attempts to maximize randomness at the cost of performance of the desensitization process. Examples of each of these techniques will be described below.

An embodiment of a desensitization technique that enhances performance of the desensitization process will be explained first. As set forth above, a sensitive ordered set, S, is created by generating a set of strings whose duplicate elements have been removed and which has been sorted in alphanumeric order. An example of a sensitive sorted set S is {air, apple, car, john, peter, sammy, tom, zoila}.

In one embodiment, a tree may be constructed that represents the entire sensitive set. However, memory constraints may make such an approach impractical, particularly for DBMSs that contain large amounts of data. Thus, in other embodiments, the contents of the DBMS are dealt with in "chunks," the size of which is determined by the user and is related to the amount of memory available to the application. In the example here, the chunk size is set to four strings and, thus, tree creation begins with a chunk composed of the subset {air, apple, car, john}.

Figure 2:
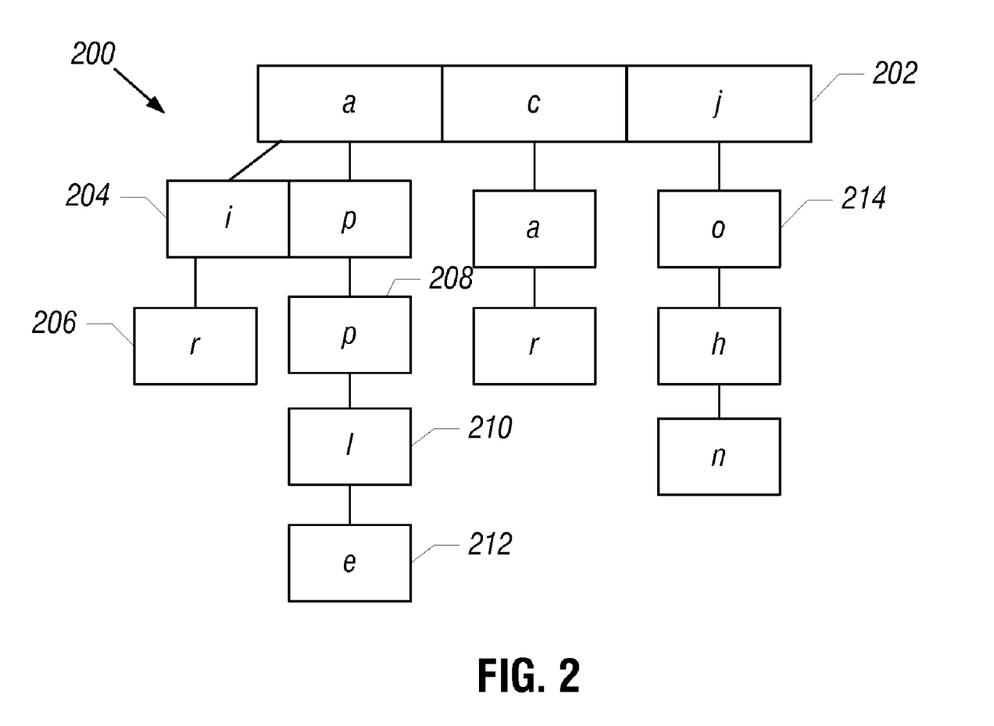
FIG. 2 is an exemplary tree structure representing a sensitive string set in accordance with an embodiment of the invention.

From this chunk, a tree 200 is constructed by placing the first character of each string in a character array to form a root node 202 of the tree. Duplicate first characters are not duplicated in the character array. Thus, for this example, the root node 202 consists of the character array {a,c,j}, as shown in FIG. 2. For each character on the root node 202, a sub-tree is created recursively. Thus, for instance, for the character "a" in the root node 202 (i.e., the parent character), a sub-tree is created that consists of a child node 204 containing the second characters in each string in the sensitive set S that begins with the character "a." In this example, the child node 204 of character "a" is the array of characters {i,p}.

A sub-tree is then created for the character "i" in the child node 204. Since only one of the strings in the set S begins with "ai," the sub-tree for the character "i" consists of only a single node 206 containing a single character "r." As this sub-tree is complete (i.e., the end of the string has been reached), the process returns to the child node 204 and creates a sub-tree for the character "p" in the same manner as just discussed. This resulting sub-tree consists of a child node 208 containing "p," a next child node 210 containing "l," and a next child node 212 containing "e."

Once the sub-tree for the first character "a" on the root node is complete, then a sub-tree is recursively created for the other characters "c" and "j" on the root node 202, until the entire tree portion 200 has been constructed for the chunk. This tree portion 202 is shown in FIG. 2. As can be seen from the tree 202, a unique path has been created for every string in the first chunk of the original set S. If the tree is traversed in depth-first order, then every time a "leaf" (i.e., the end of a string) is reached, the string may be removed from the tree and placed in a list that would replicate the sorting of the original sensitive set. Thus, if the characters in the tree are desensitized by traversing the tree in depth-first order, the resulting list of desensitized data also would preserve the ordering of the original sensitive set.

In some embodiments of the invention, the entire tree representing the first chunk may be created, desensitized and then the desensitized strings may be offloaded and placed in a list. However, memory constraints again may make such an approach impractical. Accordingly, in other embodiments, the tree is created, desensitized and offloaded incrementally. In accordance with this approach, as each node in the tree is created, it is desensitized without waiting to load the tree completely (even if the tree only represents a chunk). When a leaf is reached in the tree, then the desensitized string is saved in a list and nodes that are no longer needed are deleted. Nodes that are no longer needed are those nodes that are not used in any other string.

In accordance with an embodiment of the invention, desensitization of each node is performed by randomly generating numbers that represent positions in the desensitization character set D and assigning desensitization characters that correspond to the randomly selected positions. When the tree represents the entire sensitive set, the random assignment of desensitization characters to the sensitive characters on a node in a manner that preserves order is straightforward since the entire node is known (i.e., all the characters on the node are present). However, when the tree represents only a portion of the sensitive set (i.e., a chunk), it is possible that a node in one chunk may continue in the next chunk. In other words, a node may be "unknown." Thus, the desensitization technique used for unknown nodes must be implemented in a manner that ensures that there are enough characters in the desensitization character set for the characters in the unknown portion of the node to be desensitized in a manner that preserves the original order.

To illustrate the concept of an unknown node, assume that the root node 202 in FIG. 2 is incomplete and additional characters eventually will be inserted after "j" as further chunks are read. Assuming that the original character set C includes 26 characters (i.e., a-z), then, in a worst case scenario, 16 more characters (i.e., k-z) may be placed on the root node. Thus, to preserve order, only a portion of the desensitization character set D may be used to desensitize {a,c,j} on the node. Assuming that the desensitization set consists of 35 ordered characters, then the range of desensitization characters in set D from which random characters may be selected for {a,c,j} is "35 (i.e., the total number of desensitization characters)-16 (i.e., the worst case remaining sensitive characters on the node)=19." In other words, at most, only the first 19 desensitization characters in D may be used to desensitize {a,c,j}.

Whether a node is known or unknown may be determined as follows. In the case of the root node, the node is known if the character being processed is in the last string in the sensitive character set. When the sensitive set is processed in chunks, the root node is known if the last chunk has been read. A non-root node is known if its parent character in the node on the preceding level has a neighbor to the right. A non-root node also is known if its parent is the last character on a known node. Thus, for instance, with reference to FIG. 2, node 204 is known because its parent "a" on the root node 202 has a neighbor "c" on the right. Node 206 also is known because its parent "i" on the node 204 on the preceding level has a neighbor "p" on its right. Node 208 is known because its parent "p" is the last character on a known node 204. Node 214, however, is not yet known.

For unknown nodes, the range of desensitization characters from which to select a random character is restricted. In one implementation of the desensitization technique, this restriction is accomplished through the use of pointers to the desensitization character set which define the range of available desensitization characters. As characters in a node are desensitized, the positions of the pointers change.

Figure 3:
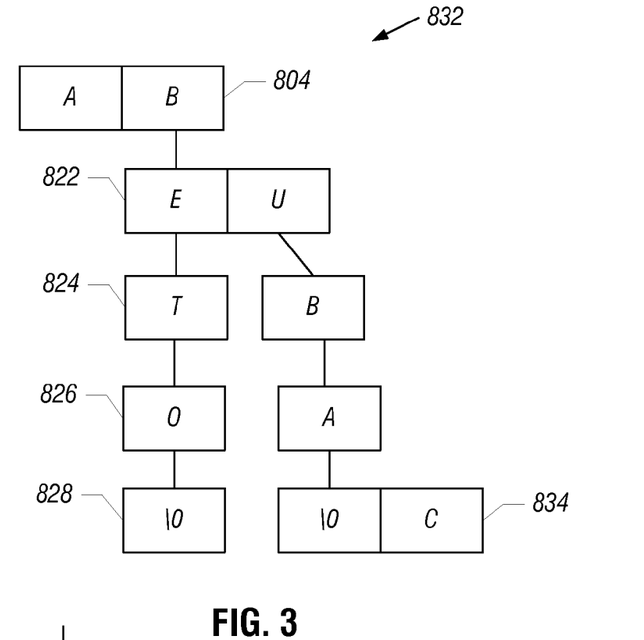
FIG. 3 is another exemplary tree structure representing desensitized characters in accordance with an embodiment of the invention.
Figure 4:
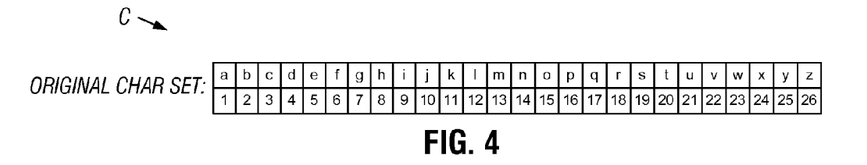
FIG. 4 is an exemplary sensitive character set, in accordance with an embodiment of the invention.
Figure 5:
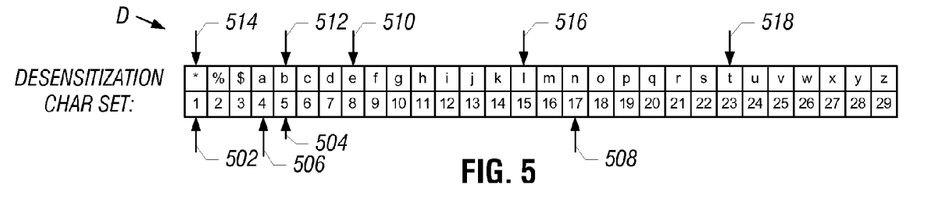
FIG. 5 is an exemplary desensitization character set, in accordance with an embodiment of the invention.

Reference is now made to FIGS. 3-6 to illustrate the concepts of dynamically loading and unloading a tree structure and desensitizing the characters in the tree structure based on whether a node is known or unknown. In this example, the original sensitive set S includes {air, aunt, ball, ballet, bell, belt, ... }. The original character set C has 26 characters (i.e., {a-z} as shown in FIG. 4), the desensitization character set D has 29 characters (i.e., {*, %, $, a-z} as shown in FIG. 5), and the chunk size is 3. As shown in FIG. 3, the chunk of size 3 is obtained (i.e., {air, aunt, ball}) and a tree portion 300 is constructed starting with a root node 302. Here, the root node 302 is unknown (i.e., it will continue in the next chunk) and the range of desensitization characters must be restricted to ensure that sufficient desensitization characters remain to preserve ordering in the worst case scenario. Thus, the range of available desensitization characters for the root node 302 is "29(i.e., the total number of available desensitization characters)-24(i.e., the worst case remaining sensitive characters on the node)=5".

With reference to FIG. 5, in one embodiment, to implement the range restriction, a left-side pointer 502 is positioned at the first position of the desensitization set D and a right-side pointer 504 is positioned at the fifth position of the set D to indicate that desensitization characters for "a" and "b" may be randomly selected from positions 1-5 of the desensitization set D. In this example, positions 2 and 3 corresponding to characters "%" and "$", respectively, are randomly selected from the restricted desensitization set and assigned to the sensitive characters in an ordered manner. In one embodiment, the positions are selected by generating random numbers from the set of numbers {1,2,3,4,5}.

Construction of the tree portion 300 then continues in depth-first order starting with the first character "a" in the root node 302. In this example, the next level node 304 consists of the second characters of the strings that begin with "a." This node 304 consists of the characters "i" and "u." In this case, the node 304 is known because its parent (i.e. "a" in the root node 302) has a neighbor "b" to the right. Accordingly, desensitization characters may be randomly selected from the entire range of set D and assigned in an ordered manner to "i" and "u." Here, position 10 (i.e., "g") is assigned to "i", and position 22 (i.e., "s") is assigned to "u."

Construction of the tree portion 300 further proceeds in depth-first order, starting with the children of the character "i." At this level, the node 306 consists of the character "r," and the node 306 is known since its parent "i" has a neighbor "u" to the right. Again, because the node 306 is known, the entire range of characters in set D is available. Here, character "l" is randomly selected to replace "r."

Construction of the tree portion 300 continues with any children of the character "r". Here, a leaf 308 is reached since "r" is the end of a string. In one embodiment, the null character "\0" is placed on the node to indicate that it is a leaf.

Figure 7:
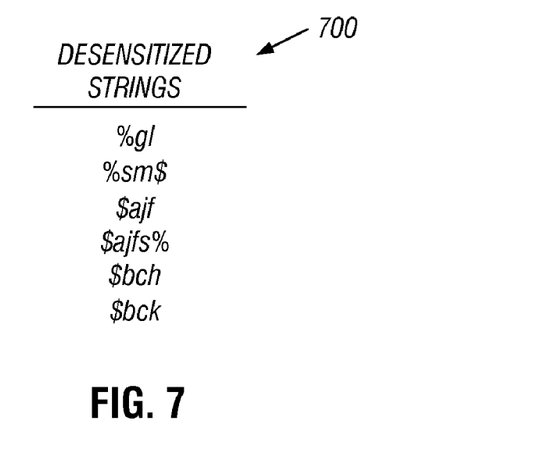
FIG. 7 is an exemplary desensitized string set, in accordance with an embodiment of the invention.

When a leaf is reached, the desensitized string may be read from the tree and placed in desensitized set of strings T. Here, set T is saved as a list 700, and the desensitized string "%gl" is placed in the list 700 as shown in FIG. 7. If any nodes associated with string "%gl" are no longer needed, then they may be deleted from the tree structure, thus maximizing the use of memory. Here, the null node 308 and the child node 306 may be offloaded from the tree portion 300 since those nodes are known and not used by any other strings. The child node 304 cannot be offloaded at this time since it is used by the next string in the sensitive set.

Tree construction and desensitization then returns to the second character "u" on the node 304. A child node 310 is constructed. This node 310 is known and, thus, a desensitization character may be randomly selected from the full range of the set D. The next child node 312 is then constructed. It also is known, and a desensitization character again may be randomly selected from the full range of the set D. When the leaf node 314 is reached, the desensitized string "%sm$" is read and placed in the list 700. Any nodes that are no longer needed may be offloaded. In this case, the nodes 304, 310, 312, and 314 all may be deleted from the tree portion 300 since they are not used by any other strings.

In this example, tree construction then returns to the root node 302 and begins constructing the children of the second character "b." Here, because the last sensitive string in the current chunk is being desensitized, none of the children nodes are known since they may continue in the next chunk. Accordingly, for the child node 316, the range of characters from the set D that may be used to desensitize "a" is restricted. In this case, the range is restricted to "29(i.e., total available characters in D)−25(i.e., worst case remaining characters on node 316)=4". Thus, the desensitization character for "a" on node 316 is randomly selected from the restricted set in positions 1-4 (i.e., {*,%,$,a}) as shown by pointers 502 and 506. In this example, position 4 corresponding to "a" is randomly selected.

The other children nodes 318 and 320 are desensitized in a like manner where the desensitization range for the node 318 is restricted to the characters in positions 1-17 in set D (via pointers 502 and 508); and the desensitization range for the node 320 also is restricted to the characters in positions 1-17 in set D via the pointers 502 and 508. When the leaf node 322 is reached, the desensitized string "$aif" is read and placed in the list 700. However, none of the nodes may be offloaded from the tree portion 300 since they are not known at this point. Note that by constructing and reading desensitized strings from the tree portion 300 in depth-first order that the ordering of the original sensitive set S is preserved in the ordered list 700.

Figure 6:
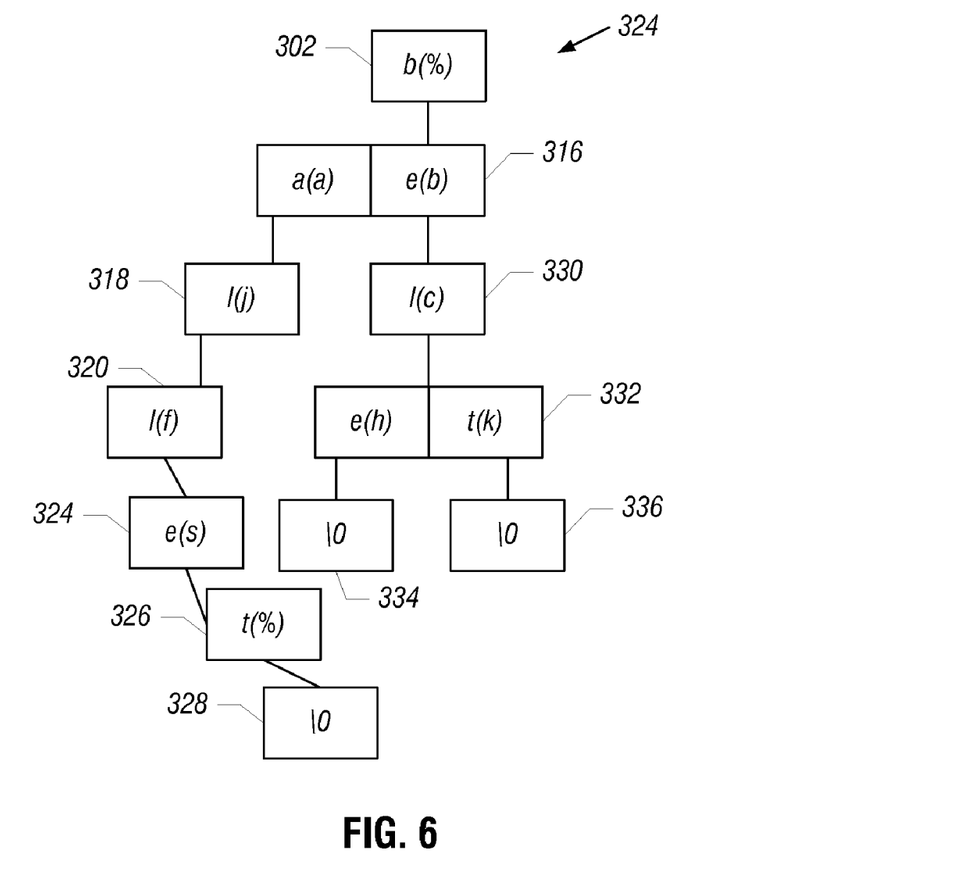
FIG. 6 is another exemplary tree structure representing desensitized characters, in accordance with an embodiment of the invention.

As shown in FIG. 6, the next chunk (i.e., {ballet, bell, belt}) is then read from the original sensitive set S and construction of the nodes of a second portion 324 of the tree continues. When desensitizing the nodes for this next chunk, however, a further restriction is placed on the range of available characters from the set D to ensure that characters are not re-used in a particular node. This restriction is implemented by preserving the desensitization that was applied to the last string of the previous chunk. As a result, with reference to FIG. 6, when construction of the node 316 continues, the mapping of original character "a" to the desensitized character "a" is preserved. Note also that the node 316 is still unknown at this point. Thus, the range of available characters in set D must be restricted. In this instance, a right-most pointer 510 again is determined based on a worst-case scenario, where the range of D must be restricted to "29−21=8" positions to ensure that enough desensitization characters remain. However, not all of positions 1-8 of set D are available since position 4 was the last position assigned to the node 316 (i.e., desensitized character "a" was selected for sensitive character "a" in the previously read chunk). Thus, a left-most pointer 512 is placed at position 5 in the set D, thus further restricting the available range of set D to {b,c,d,e}. In this example, desensitization character "b" is randomly selected from the restricted set.

Since a leaf has not been reached, the next child node 318 is then constructed starting with the children of the first character "a" on the node 316. Here, the node 318 is known and previously restricted since it was used in the last string of the previous chunk. The next child node 320 again is continued from the previous chunk and is known and restricted. The next two children nodes 324 and 326 are known, but not restricted. Thus, a character is randomly selected from the total range of set D for each node. Finally, a leaf 328 is reached, the desensitized string "$ajfs%" is read and placed in the ordered list 700. Any nodes that are no longer needed are then offloaded. Here, nodes 318, 320, 324, 326 and the null node 328 may be offloaded from the tree.

Tree construction then continues with the children of the second character "e" on the node 316. Here, the child node 330 is not known since its parent currently does not have a neighbor to its right. The node 330 also does not carry a previous restriction since it was not used in the previous chunk. Thus, in limiting the range of available desensitization characters, a left-most pointer 514 is placed at the first position in set D, and a right-most pointer 516 is placed at position 15 (i.e., 29−14), and a character is randomly selected from positions 1-15 of set D. The next child node 332 also is not known and is not previously restricted. Thus, the left-most pointer 514 remains at the first position in set D, and a right-most pointer 518 is placed at position 23 (i.e., 29−6) and two characters are randomly selected from positions 1-23 of set D. A leaf 334 is then reached, desensitized string "$bch" is read and placed in the ordered list 700. A leaf 336 is next reached, desensitized string "$bck" is read and placed in the ordered list 700. Since none of the nodes (other than the null node) are known, they are left on the tree. Tree construction continues in this manner until the entire sensitive set has been desensitized.

The implementation of the desensitization technique described above focused on performance of the algorithm while restricting the randomness of the desensitization process (i.e., the range of desensitization choices was restricted if nodes were unknown). In other embodiments, the desensitization technique may be implemented in a manner that results in a higher degree of randomness, but sacrifices performance to some extent. In accordance with such an embodiment, a representation of the tree corresponding to the entire sensitive set S is generated and saved to memory before desensitization begins. Thus, all nodes on the tree are known before desensitization occurs.

Figure 8:
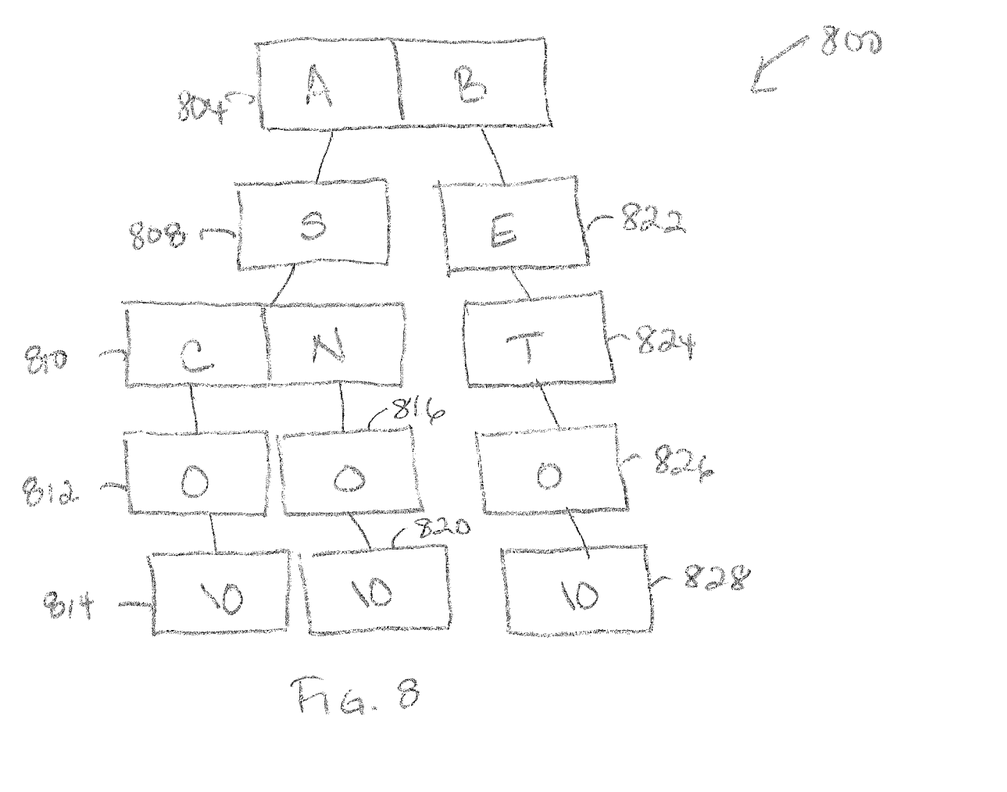
FIG. 8 is another exemplary tree structure representing a sensitive string set in accordance with an embodiment of the invention.
Figure 9:
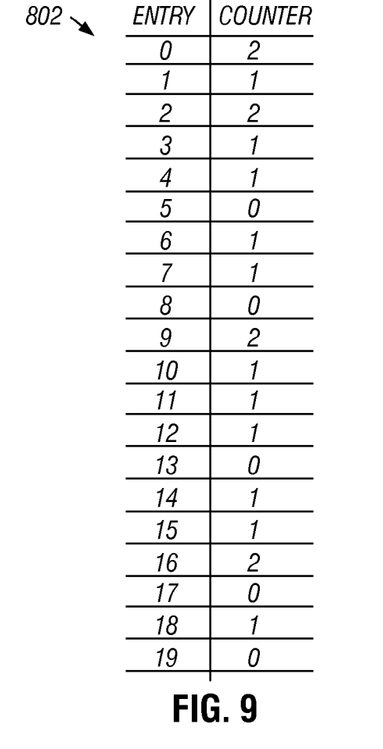
FIG. 9 is an exemplary table of counters corresponding to the tree structure in FIG. 8, in accordance with an embodiment of the invention.
Figure 10:
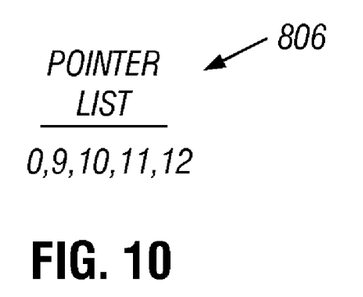
FIG. 10 is an exemplary list of pointer addresses corresponding to the table of counters in FIG. 9 and the tree structure in FIG. 8, in accordance with an embodiment of the invention.
Figure 11:
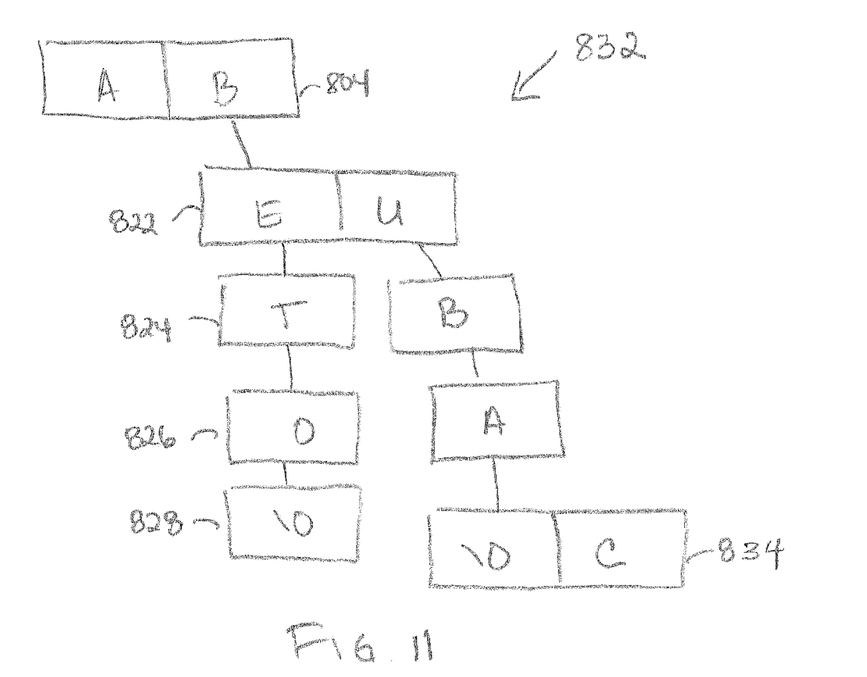
FIG. 11 is another exemplary tree structure representing a sensitive string set in accordance with an embodiment of the invention.

To illustrate, assume that the original sensitive set S consists of {ASCO, ASNO, BETO, BOBO, BUBA} and that the chunk size is three. In this example, the first chunk {ASCO, ASNO, BETO} is read and a tree portion 800 for the chunk is constructed, as shown in FIG. 8. For each node, a counter representing the number of characters on that node is saved in, for instance, a file 802 as shown in FIG. 9. In this example, the root node 804 of the tree portion 800 contains the array {A,B}. Thus, the counter "2" is saved to the file 802. If a node is unknown at this point, then the pointer address of its counter in the file 802 is saved, such as in a list 806 as shown in FIG. 10. Here, the root node 804 is unknown. Since the counter "2" is in entry "0" in the file 802, a pointer address of "0" is saved in the list 806.

Construction of the tree portion 800 continues in depth-first order. In this example, the first child node 808 (which is hanging from the first character "A" on the root node 804) has one character and is known. Thus, the counter "1" is placed in entry "1" of the file 802. Since the node 808 is known, a pointer address is not added to the list 806. The next child node 810 hangs from the character "S" on the preceding child node 808, contains two characters, and is known. The following child node 812 contains one character and is known. The next node 814 is a leaf and thus contains the null character and is known. Accordingly, when the leaf 814 is reached, the file 802 includes counters {2, 1, 2, 1, 1} and the list of pointers 806 includes only one pointer address "0" which corresponds to the unknown root node 804. In one embodiment of the invention, and as shown in FIG. 8, the character "0" is added to the file 802 whenever an immediately preceding entry (e.g., entry "4") corresponds to a leaf.

As tree construction progresses, pointer address in the list 806 are used to update the counters for unknown nodes as more characters are added to those nodes. Thus, the pointer addresses for known nodes need not be saved since the counters for a known node will not change during the tree construction process.

Returning to FIG. 8, construction of the tree portion 800 for the first chunk returns to the node 810 to continue with the sub-tree hanging from the second character "N" on that node. A first child node 816 in this sub-tree hangs from "N." consists of one character, and is known. Thus, the character "1" is appended to the file 802. The next child node 820 is a leaf. Thus, a "1" again is appended to the file 802 and a "0" is added to indicate that the previous entry corresponds to a leaf. Since all nodes in this sub-tree are known, the list of pointers 806 is not updated.

Construction of the tree portion 800 for the first chunk then returns to the sub-tree hanging from the second character "B" on the root node 804. Since all the nodes in this sub-tree are used in the last word of the chunk, all of the nodes potentially may be incomplete and thus are unknown. Thus, the pointer addresses to their counters in the file 802 are saved in the list of pointers 806. The complete file 802 is shown in FIG. 9. The complete list of pointers 806 is shown in FIG. 10, where the pointer address "9" corresponds to unknown node 822 which has a counter "1" in the ninth entry in the file 802; the pointer address "10" corresponds to unknown node 824 which as a counter "1" in the tenth entry in the file 802; the pointer address "11" corresponds to the unknown node 826 which has a counter "1" in the eleventh entry in the file 802; and the pointer address "12" corresponds to the leaf node 828 which has a counter "1" in the twelfth entry in the file 802.

Figure 12:
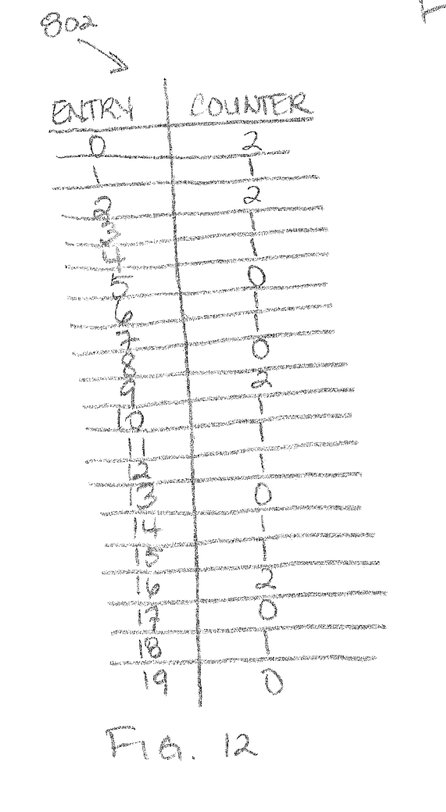
FIG. 12 is an exemplary table of counters corresponding to the tree structures in FIGS. 8 and 11, in accordance with an embodiment of the invention.
Figure 13:
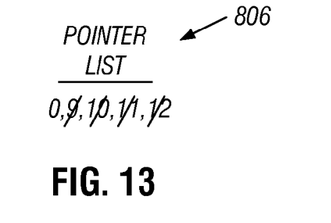
FIG. 13 is an exemplary list of pointer addresses corresponding to the table of counters in FIG. 12 and the tree structures in FIGS. 8 and 11, in accordance with an embodiment of the invention.

At this point, since the tree portion 800 for the first chunk is complete, all complete nodes may be removed from the tree 800 before continuing on to the next chunk. Here, nodes 808, 810, 812, 814, 816 and 820 are deleted from the tree 800. The next (and last) chunk {BOBO, BUBA} is read from the sensitive set S and construction of the corresponding tree portion 832 continues. If, during the tree construction, an unknown node changes its character count, then the corresponding counter in the file 802 is updated via its pointer. If a formerly unknown node becomes known, its pointer may be removed from the list of pointers 806. To illustrate, in this example, the child node 822 changes its character count when the second chunk is obtained. Thus, the counter in the ninth entry in the file 802 is updated to "2." The node also is now complete since all chunks in the original sensitive set S have been read. Thus, the pointer address "9" may be removed from the list 806. FIG. 12 shows the updated file 802, and FIG. 13 shows the list of updated pointers 806 after the entire sensitive set S has been read. Note that node 834 contains both the null character "\0" to indicate a leaf and a character "C" to indicate the end of the sensitive set S.

The complete file of counters 802 representing the tree for the entire sensitive set S may then be used to create desensitized nodes of a tree that represents the desensitized set. Desensitization occurs in depth-first order in order to preserve the ordering of the original sensitive set S. In this example, a desensitized root node is created that contains two desensitized characters. The two characters are randomly selected from the entire set of desensitization characters D, sorted, and placed on the desensitized node in sorted order. In one embodiment, the characters may be selected by randomly generating numbers that correspond to the characters' positions in the desensitization set D. The next counter in the file 802 corresponds to the next node which, because the desensitized tree is constructed in depth-first order, hangs off the first character of the desensitized root node. This node contains one character that has been randomly selected from the entire set D. The next counter in the file 802 corresponds to the next child node which hangs from the first character on the immediately preceding desensitized node. In this example, the counter indicates that the node contains two characters, which again are randomly select from set D and placed on the desensitized node in sorted order. This process continues until a "0" counter is reached in the file 802, indicating that a leaf has been found. If a leaf is found, then the string in the path from the desensitized root node to the leaf is read and saved to a set of desensitized strings (without the last character, which simply indicated the presence of a leaf). Any nodes that are not used by other strings are then deleted from the desensitized tree structure. This process continues until all desensitized strings have been offloaded and saved to the desensitized set.

Figure 14:
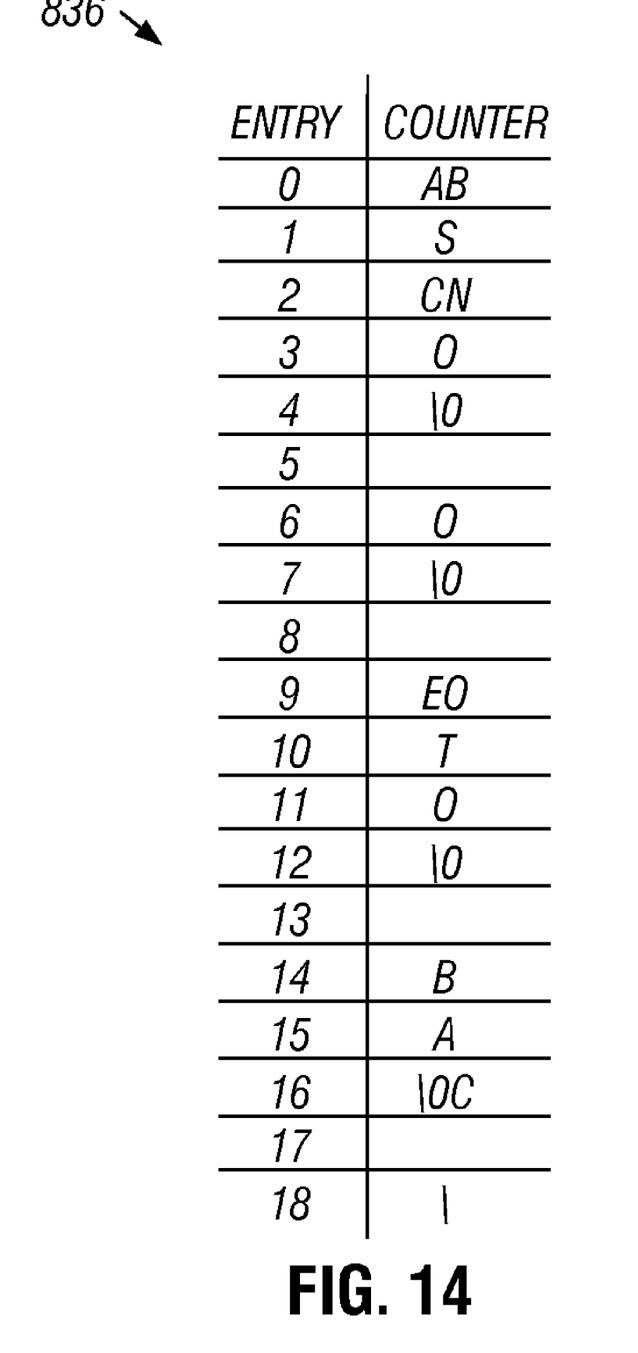
FIG. 14 is an exemplary table of characters corresponding to the tree structures in FIGS. 8 and 11, in accordance with an embodiment of the invention.

In an alternative implementation of the randomness-based desensitization technique, rather than generating counters that represent the number of characters on each node, the node characters themselves are saved to a file 836, as shown in FIG. 14. By saving the node characters, each character can be desensitized in a manner that preserves the byte length of the original sensitive character. Thus, for instance, in the example just described, each entry in the file 836 will contain the characters on the corresponding node. Note that in FIG. 14, the leaf character is followed by a blank entry in the file (e.g., entries 5, 8, 13, 17). The list of pointers is maintained as described above so that the characters for each unknown node may be updated as the nodes become known.

After the entire sensitive set has been read and the characters on each node of the corresponding tree structure have been placed in the file 836, the characters are desensitized and the desensitized string set is generated. When generating the desensitized set, each character on a node is randomly replaced with alphanumerically sorted characters of the same byte size. Again, the nodes are desensitized in depth-first order. Desensitized strings are read from the tree and placed in the desensitized set whenever a leaf is reached. Nodes that are no longer needed are then deleted from the tree. The process continues until the entire desensitized set has been generated.

The desensitization techniques described above may be implemented in a variety of different types of computing systems depending on the type of application in which the desensitization technique is being used. For instance, the desensitization technique may be implemented in a database system, such as the system 840 shown in FIG. 15, which includes a processing system 842 coupled to a database storage system 844 via an appropriate communication link 846. A user interface 848, such as a graphical user interface, pointing device, keyboard, etc., is coupled to the processing system 842 to enable a user to interface with the desensitization algorithm. For instance, the user may employ user interface 848 to initiate the desensitization process, input parameters associated with the desensitization process (e.g., chunk size, character sets, etc.), to select between performance-based or randomness-based implementations of the desensitization process, and to view the results of the desensitization process, including the results of troubleshooting routines that are executed using the desensitized strings.

Figure 15:
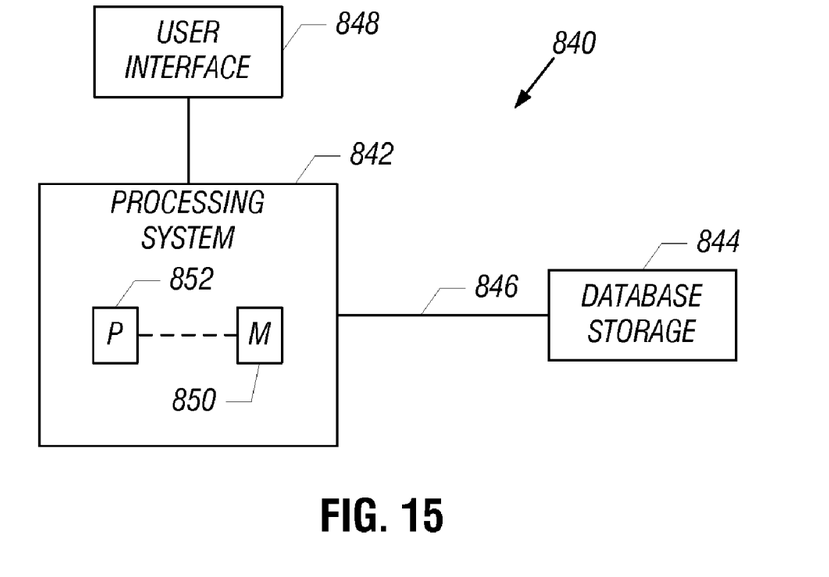
FIG. 15 is a block diagram of a system in which the technique of FIG. 1 may be implemented, in accordance with an embodiment of the invention.

In the system shown in FIG. 15, instructions of software corresponding to the desensitization techniques described above may be stored in a memory device 850 and loaded for execution by a processing device 852. The data contained in the database system may be stored in the database storage 844. Data and files generated during the desensitization process, such as the tree structure, counter files, pointer lists, desensitized lists, etc., also may be stored in memory 850. The processing device 852 may include one or more microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

The storage device(s) for storing both data and software instructions may be implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

For any of the techniques discussed above, the technique may include additional, fewer, and/or different steps than those discussed above. Further, in some embodiments, some steps may be performed in a different order than that discussed above and some steps may be performed in parallel or sequentially.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for desensitizing character strings, comprising:
   ordering, by a processing device, a set of sensitive character strings;
   generating, by the processing device, a tree having a plurality of nodes corresponding to sensitive characters of the sensitive character strings;
   desensitizing, by the processing device, the sensitive characters on corresponding nodes of the tree in depth-first order, wherein the desensitizing includes assigning desensitization characters from a set of ordered desensitization characters to respective ones of the sensitive characters; and
   generating, by the processing device, a desensitized character string set having a same ordering as the ordered set of sensitive character strings, the desensitized character string set including desensitized character strings corresponding to respective ones of the sensitive character strings, wherein the desensitized character strings include respective strings of the desensitization characters.

2. The method as recited in claim 1, wherein generating the tree comprises:
   generating a first portion of the tree, wherein the first portion of the tree has a first plurality of nodes corresponding to a first portion of the set of sensitive character strings; and
   after desensitizing sensitive characters on the first plurality of nodes, generating a second portion of the tree, wherein the second portion of the tree has a plurality of nodes corresponding to a second portion of the set of sensitive character strings.

3. The method as recited in claim 1, wherein assigning the desensitization characters comprises assigning the desensitization characters randomly selected from the set of ordered desensitization characters.

4. The method as recited in claim 3, further comprising restricting random selection of desensitization characters from the set of ordered desensitization characters when desensitizing sensitive characters on an unknown node.

5. The method as recited in claim 1, wherein the desensitizing further comprises:
   generating a list of counters corresponding to sensitive characters on respective nodes of the tree; and
   for each node of the tree, selecting a quantity of desensitization characters from the set of ordered desensitization characters based on the list of counters.

6. The method as recited in claim 1,
   wherein each of the assigned desensitization characters has a byte length that is the same as the corresponding sensitive character.

7. The method as recited in claim 1, wherein the character strings are selected from the group consisting of social security numbers, birthdates, telephone numbers, and salaries.

8. The method as recited in claim 1, further comprising:
   receiving a query referencing a particular sensitive character string, the query to access data in a database, wherein the set of sensitive character strings includes the particular sensitive character string, and wherein the desensitizing includes desensitizing the particular sensitive character string.

9. A method of desensitizing sensitive strings, comprising:
   generating, by a processing device, a set of ordered sensitive strings;
   generating, by the processing device, a tree corresponding to a first portion of the set of ordered sensitive strings, wherein the tree comprises a first plurality of nodes containing sensitive characters of the first portion of the ordered sensitive strings and leaf nodes corresponding to an end of each sensitive string in the first portion;
   desensitizing, by the processing device, the tree by assigning desensitization characters to respective ones of the sensitive characters on the nodes of the tree in depth-first order; and
   generating, by the processing device, a set of desensitized strings, where a desensitized string is added to the set of desensitized strings whenever a leaf node is reached in the tree during the desensitization, and where the desensitized strings include corresponding strings of the desensitization characters.

10. The method as recited in claim 9, wherein desensitizing the tree comprises:
   providing a set of ordered desensitization characters;
   randomly selecting desensitization characters from the set of ordered desensitization characters; and
   assigning the randomly selected desensitization characters to the sensitive characters on respective nodes of the tree in an ordered manner.

11. The method as recited in claim 10, further comprising limiting a range of desensitization characters that are available for random selection from the set of ordered desensitization characters for a node of the tree that is unknown.

12. The method as recited in claim 9, wherein desensitizing the tree comprises:
   providing a set of ordered desensitization characters;
   generating a list of counters, wherein each counter corresponds to a quantity of sensitive characters on a node of the tree; and
   based on the counter for each node, randomly selecting desensitization characters from the set of ordered desensitization characters; and
   assigning the selected desensitization characters to the corresponding node in an ordered manner.

13. The method as recited in claim 9,
   wherein each of the assigned desensitization characters has a byte length that is the same as a byte length of the corresponding sensitive character.

14. The method as recited in claim 9, further comprising:
   after adding a particular desensitized string to the set of desensitized strings, deleting nodes corresponding to the particular desensitized string from the tree that are not used by desensitized strings that have not yet been added to the set of desensitized strings.

15. A processing device-readable storage medium storing instructions that upon execution cause a processing device to:
   generate an ordered set of sensitive character strings;
   store in a memory a tree corresponding to the ordered set of sensitive character strings, wherein the tree comprises a plurality of nodes containing sensitive characters of the sensitive character strings and leaf nodes corresponding to ends of the sensitive character strings;
   provide a set of ordered desensitization characters;
   desensitize the sensitive characters on the nodes of the tree in depth-first order, wherein the desensitizing includes assigning selected desensitization characters from the set of ordered desensitization characters to respective ones of the sensitive characters on the nodes of the tree; and
   upon reaching a particular leaf node, store in the memory a desensitized string extending between a root node and the particular leaf node, wherein the desensitized string includes a group of the assigned desensitization characters.

16. The processing device-readable storage medium as recited in claim 15, wherein the instructions are executable to:
   generate a first portion of the tree to store in the memory, wherein the first portion corresponds to a first portion of the ordered set of sensitive character strings; and
   wherein desensitizing the sensitive characters comprises:
      determining whether the sensitive characters are on an unknown node; and
      if so, restricting selection of desensitization characters for assignment to the unknown node to a limited portion of the set of ordered desensitization characters,
      else, selecting desensitization characters from the complete set of ordered desensitization characters.

17. The processing device-readable storage medium as recited in claim 15, wherein the instructions are executable to:
   after storing the desensitized string in the memory, delete from the memory any nodes corresponding to the desensitized string from the tree that are not used by desensitized strings that have not yet been stored in the memory.

18. The processing device-readable storage medium of claim 15, wherein the instructions are executable to further:
   receive a query referencing a particular sensitive character string, the query to access data in a database, wherein the ordered set of sensitive character strings includes the particular sensitive character string, and wherein the desensitizing includes desensitizing the particular sensitive character string.

* * * * *